United States Patent [19]

Williamson

[11] Patent Number: 4,759,411
[45] Date of Patent: Jul. 26, 1988

[54] SELECTIVE PIVOTAL MOUNTING ARRANGEMENT FOR COULTERS

[75] Inventor: Gerald E. Williamson, Macomb, Ill.

[73] Assignee: Yetter Manufacturing Company, Colchester, Ill.

[21] Appl. No.: 939,944

[22] Filed: Dec. 9, 1986

[51] Int. Cl.⁴ .................... A01B 35/28; A01B 61/04; A01B 15/18
[52] U.S. Cl. ................................ 172/572; 172/602
[58] Field of Search .............. 172/386, 572, 383, 573, 172/166, 752, 254, 603, 602

[56] References Cited
U.S. PATENT DOCUMENTS

| 2,375,372 | 5/1945 | Laitinen | 172/602 |
| 3,351,139 | 11/1967 | Schmitz | 172/602 |
| 3,405,767 | 10/1968 | Thompson | 172/572 |
| 3,411,589 | 11/1968 | Moe | 172/572 |
| 3,529,676 | 9/1970 | Moe | 172/572 |
| 3,700,037 | 10/1972 | Hentrich | 172/572 X |

FOREIGN PATENT DOCUMENTS 547948 10/1957 Canada .................. 172/603

Primary Examiner—Richard J. Johnson
Attorney, Agent, or Firm—Mann, McWilliams, Zummer & Sweeney

[57] ABSTRACT

A mounting arrangement for fertilizer coulters including a selective locking mechanism whereby, at the option of the operator, the coulter may be permitted to pivot about the coulter supporting shank or be locked in place.

3 Claims, 2 Drawing Sheets

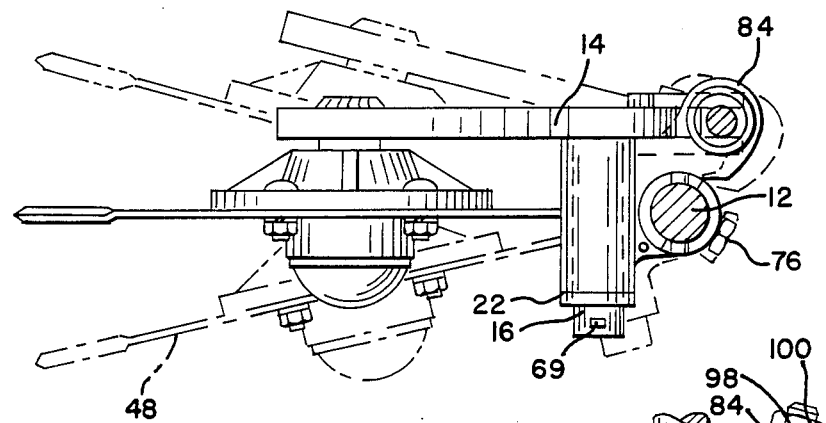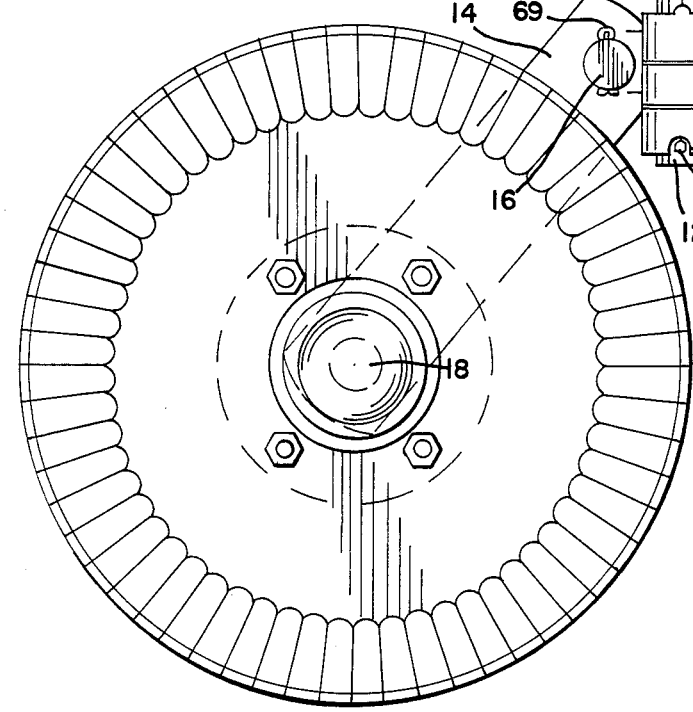

SELECTIVE PIVOTAL MOUNTING ARRANGEMENT FOR COULTERS

BACKGROUND OF THE INVENTION

The present invention is directed to mounting arrangements in which coulters are supported by and connected to portable tool bars. Numerous arrangements of this general type are shown in the prior art U.S. Pat. Nos. 1,162,934, 1,198,942, 1,790,956, 3,061,018, 3,292,562, 3,319,589, 3,351,139 and 3,799,079. None of these devices provides a locking mechanism which may be selectively positioned relative to the shank so as to permit the coulter to pivot about the shank or to be locked to the shank at the option of the operator.

SUMMARY OF THE INVENTION

The present invention provides a mounting arrangement for coulters especially designed such that the operator, depending upon soil conditions or contour of the land, may elect to have the coulter pivot about the shank or, alternatively be locked to the shank by activation of a locking mechanism disposed between the shank and a mounting collar.

BRIEF DESCRIPTION OF THE DRAWINGS

FIG. 2 shows a top view of the mounting arrangement and coulter wheel in an assembled position and phantom views indicating the pivotal movement of the coulter wheel about the shank when the locking mechanism is in a first position.

FIG. 3 shows a side view of the coulter attached to a portable frame with the locking means in a second position so that the coulter is prevented from pivoting about the shank.

DETAILED DESCRIPTION OF THE INVENTION

Figure 1:
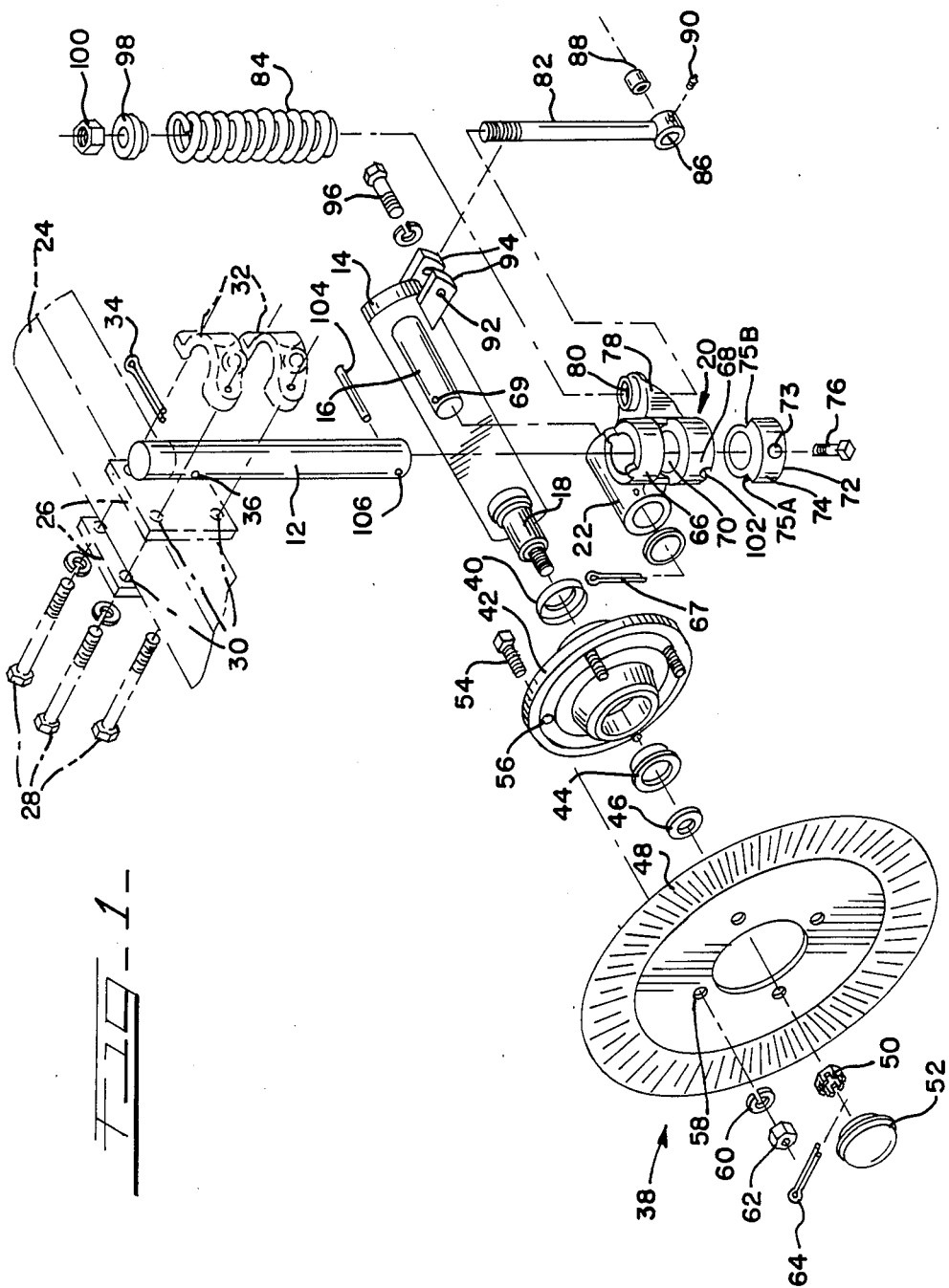
FIG. 1 shows an exploded view of the mounting arrangement and the coulter wheel assembly.

A mounting arrangement for coulters is shown in FIG. 1. The mounting arrangement includes a shank 12 which is vertically disposed and generally cylindrical, a support arm 14 having a shaft 16 and an axle 18, and a mounting collar 20 with a sleeve 22. The shank 12 is attached to a tool bar 24, shown in phantom, which is pulled by a tractor. Plates 26 disposed on opposing faces of the tool bar 24 are secured by means of four bolts 28 which are inserted through corresponding apertures 30 in the plates 26 and threaded into clamps 32 which secure the shank 12 to the tool bar 24. A cotter pin 34 is inserted through an aperture 36 in the upper end of the shank 12 between the clamps 32, thereby further preventing the shank 12 from sliding too far downward or upward.

The support arm 14 is a substantially flat, rectangular member having the shaft 16 extending from one end and the axle 18 extending from the other end, such that the shaft 16 and axle 18 extend parallel to one another. The axle 18 is sized to receive and rotatably support a coulter wheel assembly 38, consisting of and placed about the axle 18 in the following order: a seal 40, a hub 42, a bearing 44, a flat washer 46, a coulter wheel 48, a slotted hex nut 50 and a cap 52 to seal grease in the bearing and prevent contamination. A plurality of lug bolts 54 are disposed through apertures 56 in the hub 42. Corresponding apertures 58 are provided in the coulter wheel 48, through which bolts 54 extend for mounting the coulter on the axle. A lock washer 60 and a hex nut 62 secure the coulter wheel to the hub. A cotter pin 64 is positioned through the slotted hex nut 50.

The sleeve 22 is formed as an integral part of the mounting collar 20. The sleeve 22 is sized to fit over the shaft 16, thereby connecting the support arm 14 and the coulter wheel assembly 38 to the mounting collar 20 for conjoint rotation. A cotter pin 67 is inserted through an aperture 69 at the end of the shaft 16 to secure the sleeve in place.

The mounting collar 20 includes an upper portion 66 and a lower portion 68, which are concentric and vertically spaced apart to define an opening 70 between them. The mounting collar 20 is sized to encircle and to freely rotate about the shank 12. A locking collar 72 is sized for insertion into the opening 70 between the upper portion 66 and the lower portion 68, the locking collar 72 also encircling the shank 12. The locking collar 72 has defined on its outer face an arcuate segment 74 with stops 75A and 75B provided, one on each end face. The locking collar 72 is secured to the shank 12 by means of a set screw 76 inserted through an aperture 73 formed in the segment 74 to engage the shank 12 and to prevent relative rotation between the locking collar and the shank. The locking collar 72 coacts with the mounting collar 20 such that when the mounting collar 20 pivots about the shank 12, the mounting collar 20 contacts stop 75A or 75B on the locking collar 72 thereby limiting the rotation of the mounting collar 20 about the shank 12 to within predetermined limits.

An outwardly extending flange 78 attached to the mounting collar 20 is provided with an aperture 80 sized to receive a pressure rod 82 over which a spring coil 84 is positioned. The pressure rod 82 has attached at its base a sleeve 86 into which a bushing 88 is inserted and secured by means of a set screw 90. The sleeve 86 is then secured between apertures 92 formed in a pair of plates 94 which are disposed at the shaft end of the support arm 14 by a bolt 96. The coil 84 is held in place with a bushing 98 and a lock hex nut 100. This spring assembly provides resiliency so that the coulter may roll over a rock or other obstruction with relative ease.

The lower portion 68 of the mounting collar 20 is provided with a groove or notch 102 one element of which is shown in FIG. 1 with a counterpart disposed 180° from the location shown in FIG. 1. A roll pin 104 is inserted through an aperture 106 at the base of the shank 12 so that the ends of the pin 104 extend from either side of the shank 12. The selective locking arrangement may be positioned to permit the mounting collar 20 to pivot about the shank 12 or to be locked to the shaft depending upon the orientation of the pin 104, the shank 12 and the mounting collar 20. When the end extensions of the pin 104 are aligned with and inserted into the groove 102, as shown in FIG. 3, the mounting collar 20 and coulter assembly 38 are locked against rotation about the shank 12. If the operator elects to allow the coulter to pivot about the shaft, the set screw 76 is loosened and the collar 20 and locking collar 72 are raised on the shank 12 until the lower surface of lower collar 68 is above the level of pin 104. The set screw 76 is then resecured to maintain the collar 20 at this level, out of engagement with pin 104. FIG. 2 of the drawings shows the coulter pivoting about the shank 12 as limited by the locking collar 72.

By locking the coulter to the shank and preventing pivoting, the coulter travels in a straight line parallel to the direction of travel of the tool bar. In this arrangement, the distance between the seed and the fertilizer varies less when planting on a contour. When using the coulter on three-point or two-point hitch planters, it is recommended that the mounting arrangement be oriented to allow pivoting of the coulter about the shank, particularly if a four-wheel drive tractor is to be used. This reduces the side load on the coulter during operation and assists in preventing damage to the coulter wheel. The locking collar can be set to allow swivel within predetermined limits in one or both directions as required by the circumstances. Under some conditions, it is necessary to lock the coulter against pivoting to prevent interference with other planter attachments, as, for example, when used in a planter no till arrangement. In rocky conditions, it is desirable to allow the coulter to swivel so it can move to the side around a rock rather than flex up the amount necessary to go over the rock.

Thus it has been shown that the present invention provides a mounting arrangement for coulters including a locking mechanism by which the operator may elect at his option either to permit the coulter to pivot about the shank or not to pivot about the shank.

Various features of the invention have been particularly shown and described in connection with the illustrated embodiment of the invention, however, it must be understood that these particular arrangements merely illustrate and that the invention is to be given its fullest interpretation with the terms of the appended claims.

What is claimed is:

1. A mounting arrangement for coulters including a vertically disposed substantially cylindrical shank adapted to be connected to a portable frame and further adapted to support a coulter wheel assembly, a mounting collar adapted to be positioned on said shank and rotatable and vertically adjustable and lockable with respect thereto, a support arm having a first end and a second end, said first end connected to said mounting collar for conjoint rotation of said arm and said mounting collar about said shank, an axle extending laterally from said support arm and disposed toward said second end, a coulter wheel assembly rotatably mounted on said axle and selective locking means including a pin disposed through an aperture in said shank, a groove formed in said mounting collar and a locking collar engageable with said shank and with said mounting collar to fix the vertical position of said mounting collar on said shaft, said selective locking means operative when said locking collar is in a first position such that said pin is disposed through said shank and lies within said groove in said mounting collar to lock said coulter against rotation about said shank and operative when said locking collar is raised to a second position such that said groove in said mounting collar is out of engagement with said pin to allow said coulter to pivot about said shank within predetermined limits.

2. A mounting arrangement for coulters as in claim 1 including a shaft extending from said support arm parallel to said axle and a sleeve formed on said mounting collar and positioned over said shaft thereby connecting said support arm to said mounting collar.

3. A mounting arrangement for coulters as in claim 1 in which said locking collar includes an arcuate segment with a stop defined at each end thereof and further includes a set screw for connecting said locking collar to said shank and preventing relative rotation therebetween.

* * * * *